United States Patent [19]

Ashikaga

[11] Patent Number: 5,523,823
[45] Date of Patent: Jun. 4, 1996

[54] METHOD AND APPARATUS FOR CORRECTING A COLOR REGISTRATION ERROR

[75] Inventor: Hideaki Ashikaga, Kanagawa, Japan

[73] Assignee: Fuji Xerox Co., Ltd., Tokyo, Japan

[21] Appl. No.: 217,804

[22] Filed: Mar. 28, 1994

[30] Foreign Application Priority Data

Mar. 29, 1993 [JP] Japan ..................... 5-069799

[51] Int. Cl.⁶ ..................... G03G 15/00; G03G 15/01
[52] U.S. Cl. ..................... 355/208; 355/271; 347/116
[58] Field of Search ..................... 355/208, 327, 355/271, 317; 347/116; 101/181; 258/548; 356/401, 429; 364/469, 471

[56] References Cited

U.S. PATENT DOCUMENTS 4,528,630  7/1985  Sargent ..................... 364/469
5,287,162  2/1994  de Jong et al. ..................... 355/208 X
5,373,355  12/1994  Ando et al. ..................... 355/327
5,457,518  10/1995  Ashikaga et al. ..................... 355/208

FOREIGN PATENT DOCUMENTS 64-88471  4/1989  Japan .

Primary Examiner—Joan H. Pendegrass
Attorney, Agent, or Firm—Finnegan, Henderson, Farabow, Garrett & Dunner

[57] ABSTRACT

A registration error detection pattern parallel to a slow scanning direction of colors are detected by pattern detecting unit, and a color registration error is corrected so that the pattern of all colors arrive at a predetermined position of the pattern detecting unit, in order to show a color registration misalignment correction method and apparatus not affected by a magnification error of pattern detecting unit or the like and provide a color registration error detection method and apparatus whereby color registration misalignment correction accuracy can be improved.

24 Claims, 15 Drawing Sheets

METHOD AND APPARATUS FOR CORRECTING A COLOR REGISTRATION ERROR

BACKGROUND OF THE INVENTION

1. Field of the Invention

This invention relates to a color registration error correction method for correcting an error in color image forming position (hereinafter, referred to as registration) for use with a color image forming apparatus which performs multiple transfers of an image of different colors onto an image support member, such as a conveyed recording member or intermediate transfer substance, for providing a color image.

2. Description of the Related Art

In recent years, documents processed at offices, etc., have quickly become colored and image forming devices such as copiers, printers, and facsimile machines for handling the documents have just as quickly been provided with color functionality. At present, the color machines tend to provide high picture quality and operate at high speed, while at the same time performing high-quality and quick operation of business processing at offices or the like. For color machines meeting these demands, for example, a so-called tandem-type color image forming apparatus is already proposed which has image forming units for each color of black (B), yellow (Y), magenta (M), and cyan (C). This apparatus performs multiple transfers of an image of different colors formed by the image forming units onto a conveyed recording member or intermediate transfer substance for forming a color image.

The tandem-type color image forming apparatus, which forms one image by using a plurality of image forming units, can operate at some degree of high speed. However, if high-speed image forming is intended, alignment of image forming positions of the colors, namely, color, registration often become degraded and the high picture quality cannot be maintained; the high picture quality is extremely incompatible with the high-speed operation. This is because the positions and sizes of the image forming units and further the positions and sizes of the parts in the image forming units subtly change due to a change in a temperature in the machine of the image forming apparatus or an external force applied to the image forming apparatus. The temperature change in the machine and external force are inevitable; for example, an external force to the image forming apparatus is a daily routine such as recovery from a paper jam, parts replacement during maintenance, moving the image forming apparatus, or the like.

For example, Japanese Patent Unexamined Publication No. Sho. 64-88471 has already proposed a registration correction apparatus which reads a shift or misalignment in color image registration and corrects it in order to provide a high quality picture. The registration correction apparatus outputs a predetermined registration misalignment measurement pattern as shown in FIG. 16 or 17 by each of image forming units, detects the registration misalignment measurement pattern with a pattern detecting unit, calculates intervals of the colors on the registration misalignment measurement pattern, and corrects the positions of the image forming units and the image forming timings so that the intervals are equal to a predetermined reference value, thereby providing a high quality picture.

However, the related art has the following problem. Since the intervals of the colors on the predetermined registration misalignment measurement pattern are set to the predetermined reference values, the registration correction apparatus in the related art is prone to be affected by a magnification error in the fast(main) and slow(sub) scanning directions of the pattern detecting unit and a high-precision color registration error correction cannot be made.

The following pattern detecting unit magnification errors are possible:

i) Variation or fluctuation in magnification in the optical system of the pattern detecting unit. It is extremely difficult to hold the magnification in the optical system to a predetermined constant value.

ii) If an array-like sensor, such as a CCD sensor, is adopted for the pattern detecting unit, variation or fluctuation in arrangement pitch of the sensor array may occur.

iii) Magnification error occurring when the move speed of the registration misalignment measurement pattern deviates from the design value. This error occurs only in the slow scanning direction.

If each of the three sources has a magnification error of 1% and the color registration misalignment is corrected so that the intervals of the colors on the registration misalignment measurement pattern are set to a predetermined reference value, for example, 10 mm, the color registration misalignment does not reach zero; instead it becomes no less than about 200–300 μm. This means that it is difficult to provide a high picture quality by the conventional method even if a correction is applied to the image forming units, etc.

The magnification error in the slow scanning direction can be solved by using a registration misalignment measurement pattern shown in FIG. 18 whereby toner patterns of all colors can be detected at almost the same time, but the method introduces the following new problems:

i) Long pattern detecting unit is required.

ii) If the pattern detecting unit arrangement is not slow to the move direction of the registration misalignment measurement pattern, the picture elements detected for each color differs, causing an error.

SUMMARY OF THE INVENTION

It is therefore an object of the invention to show a color registration misalignment correction method not affected by a magnification error of pattern detecting unit or the like, and to provide a color registration error detection method whereby color registration misalignment correction accuracy can be improved.

Towards that end, according to the invention, there is provided a method of correcting a color registration error comprising the steps of forming a pattern for detecting a registration error on an image support member, detecting the registration error detection pattern, detecting a color registration error from the detection signal, and correcting the color registration error, wherein the registration error detection pattern has line portions parallel to a slow scanning direction of colors, the line portions of the registration error detection pattern are detected by the pattern detecting unit, and the color registration error is corrected so that the line portions of all colors arrive at a predetermined position in a fast scanning direction of the pattern detecting unit.

According to the invention, there is provided a method of correcting a color registration error comprising the steps of forming a pattern for detecting a registration error on an image support member, detecting the registration error detection pattern, detecting a color registration error from the detection signal, and correcting the color registration error, wherein the registration error detection pattern has line portions parallel to a slow scanning direction of colors, the line portions of the registration error detection pattern are detected by the pattern detecting unit, and the color registration error is corrected so that the line portions of all colors other than a particular color arrive at a position in a fast scanning direction at which the line portion of the particular color arrives at the pattern detecting unit.

Further, according to the invention, there is provided a method of correcting a color registration error comprising the steps of forming a pattern for detecting a registration error on an image support member, detecting the registration error detection pattern, detecting a color registration error from the detection signal, and correcting the color registration error, wherein the registration error detection pattern has line portions parallel to a fast scanning direction of colors, the line portions of the registration error detection pattern arrive at the pattern detecting unit in sequence, the registration error detection pattern is made up of n+1 (where n is a predetermined positive integer) line portions for a particular color and n line portions for any other color, and the color registration error is corrected so that $R_j$ becomes equal to a predetermined value when no color registration errors exist in the colors, wherein $$R_j = \{\Sigma(T_{1,j+1} - T_{1j})/n\}/\{\Sigma(T_{ij} - T_{1j})/n\} = (T_{1,n+1} - T_{1,1})/\{\Sigma(T_{ij} - T_{1j})\}$$

where takes j=1–n;

$T_{1j}$ is the time at which the jth line portion of the particular color arrives at the pattern detecting unit; and $T_{ij}$ is the time at which the jth line portion of any other color arrives at the pattern detecting unit (i is the number of colors and an integer of 2 to n).

A transfer conveyor belt for holding recording paper is used, for example, as the image support member, but the image support member is not limited to it. An intermediate transfer substance, etc., or a drum-like substance for once holding images formed by image forming units may of course be used.

Used are devices which form images in electrophotographic process, for example, as the image forming units.

In addition, any image forming units, such as those for transferring a pigment of an ink ribbon, etc., by heat or impact or jetting ink for forming an image, may be used as the image forming units.

In the invention, the registration error detection pattern has line portions parallel to a slow scanning direction of colors, the line portions of the registration error detection pattern are detected by the pattern detecting unit, and the color registration error is corrected so that the line portions of all colors arrive at a predetermined position in a fast scanning direction of the pattern detecting unit, or the line portions of the registration error detection pattern are detected by pattern detecting unit and the color registration error is corrected so that the line portions of all colors other than a particular color arrive at a position in a fast scanning direction at which the line portion of the particular color arrives at the pattern detecting unit. Thus, the color registration can be corrected with a uniquely determined position not affected by a magnification error of the pattern detecting unit, such as the predetermined position in the fast scanning direction of the pattern detecting unit or the position in the fast scanning direction at which the line portion of the particular color arrives at the pattern detecting unit, as a reference. Even if the pattern detecting unit contains an error such as a detecting magnification error, an error in the fast scanning direction of the color registration can be corrected accurately.

In the invention, the registration error detection pattern has line portions parallel to a fast scanning direction of colors, the line portions of the registration error detection pattern arrive at the pattern detecting unit in sequence, the registration error detection pattern is made up of n+1 (where n is a predetermined positive integer) line portions for a particular color and n line portions for any other color, and the color registration error is corrected so that $R_j$ becomes equal to a predetermined value when no color registration errors exist in the colors, wherein $$R_j = \{\Sigma(T_{1,j+1} - T_{1j})/n\}/\{\Sigma(T_{ij} - T_{1j})/n\} = (T_{1,n+1} - T_{1,1})/\{\Sigma(T_{ij} - T_{1j})\}$$

where takes j=1–n;

$T_{1j}$ is the time at which the jth line portion of the particular color arrives at thee pattern detecting unit; and $T_{ij}$ is the time at which the jth line portion of any other color arrives at the pattern detecting unit (i is the number of colors and an integer of 2 or more). Thus, the time intervals between the line portion of the particular color as a reference and the jth line portions of other colors are found in sequence and are averaged, and the color registration error can be corrected so that the average becomes equal to a predetermined value when no color registration errors exist in the colors. Even if the pattern detecting unit contains an error such as a detected magnification error, an error in the slow scanning direction of the color registration can be corrected accurately.

DETAILED DESCRIPTION OF THE PREFERRED EMBODIMENTS

The preferred embodiment of the present invention will be described accompanying with the drawings.

Figure 2:
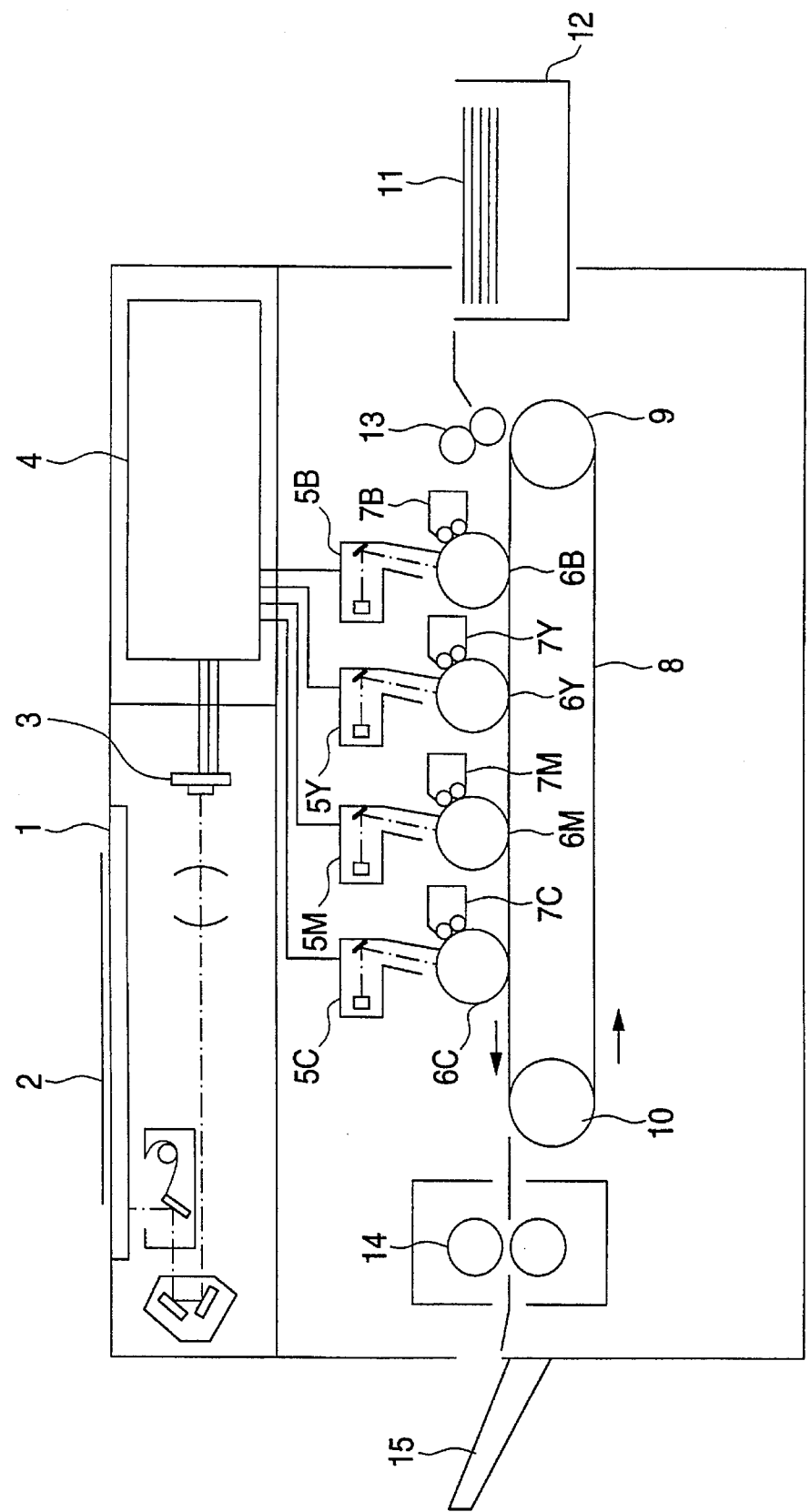
FIG. 2 is a configuration diagram showing one embodiment of the digital color copier for carrying out the color registration error correction method according to the invention.

FIG. 2 is a general configuration diagram showing a digital color copier as one embodiment of a color image forming apparatus for carrying out a color registration error correction method according to the invention.

In FIG. 2, an original 2 placed on a platen glass plate 1 is detecting as analog picture signals of RGB through a scanning optical system comprising a light source, scanning mirror, and the like, by an image scanner having a color CCD sensor 3. The analog picture signals of RGB detected by the color CCD sensor 3 are converted into picture signals of B, Y, M and C by an image processing section 4, and the picture signals of B, Y, M and C are stored temporarily in a memory located in the image processing section 4.

The image processing section 4 outputs image data of the colors to laser beam scanners 5B, 5Y, 5M, and 5C of image forming units in sequence, and the laser beam scanners 5B, 5Y, 5M, and 5C form electrostatic latent images on their photosensitive drums 6B, 6Y, 6M, and 6C. The electrostatic latent images formed on the photosensitive drums 6B, 6Y, 6M, and 6C are developed as color toner images of black (B), yellow (Y), magenta (M), and cyan (C) by developing devices 7B, 7Y, 7M, and 7C.

Recording paper 11 for recording the color toner images formed on the photosensitive drums 6B, 6Y, 6M, and 6C is fed from a paper feed cassette 12. The recording paper 11 fed from the paper feed cassette 12 is sent onto a transparent paper transfer conveyor belt 8 by a feed roller 13 driven for rotation at a predetermined timing. The transfer conveyor belt 8 is placed on a driving roller 9 and a driven roller 10 in an endless manner in given tension and is driven circularly at a predetermined speed in the arrow direction in FIG. 2 by the driving roller 9 driven for rotation by a dedicated motor (not shown) excellent in a constant-speed property.

The paper feed timing and image write timing are determined so that the tip of the recording paper 11 transported by the transfer conveyor belt 8 matches the tip of the image formed on the first photosensitive drum 6B by the image forming unit at the transfer point of the lowest point of the photosensitive drum 6B. When the recording paper 11 arrives at the transfer point, the visible image on the photosensitive drum 6B is transferred to the recording paper 11 by a colotoron (not shown), etc., for transfer, and further the recording paper 11 arrives at a transfer point just under the photosensitive drum 6Y. At the time, the visible image on the photosensitive drum 6Y is transferred to the recording paper 11 as the visible image on the photosensitive drum 6B. Likewise, the visible images on the photosensitive drums 6M and 6C are transferred to the recording paper 11. Then, the recording paper 11 is further transported by the belt 8. When it arrives around the driven roller 10, the recording paper 11 is stripped from the transfer conveyor belt 8 by colotoron, stripper (not shown), or the like, for stripping the recording paper 11 from the belt 8. Then, the recording paper 11 to which the toner images of four colors are transferred is fixed by a fixing device 14 and is discharged to a discharge tray 15 for copying a color image.

Figure 3:
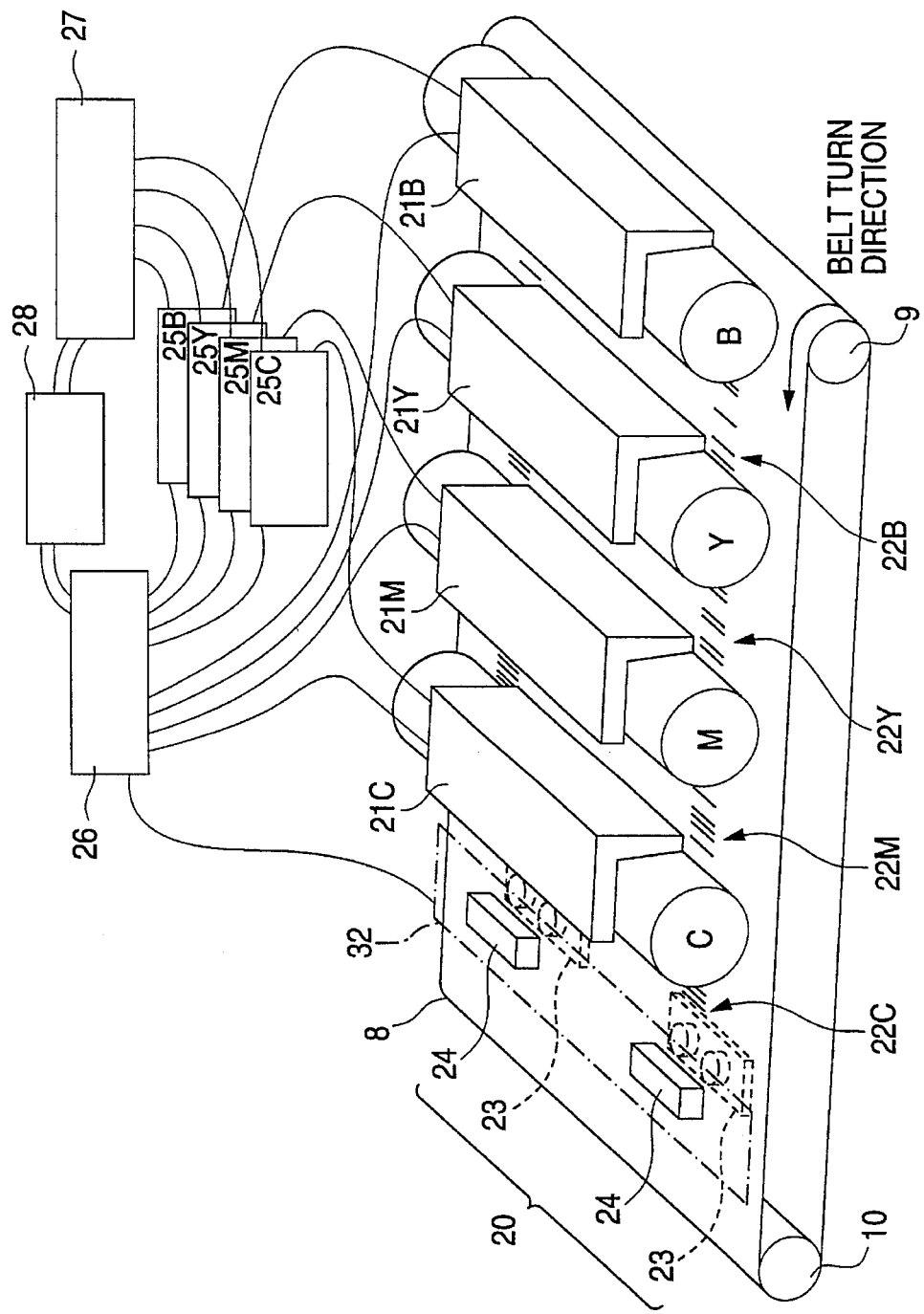
FIG. 3 is a perspective configuration diagram of the main parts of the digital color copier in FIG. 2.

FIG. 3 is a schematic view showing the digital color copier of the multiple transfer system for carrying out a color registration error correction method.

In FIG. 3, a pattern detection unit 20 for image position detection detects image position detection pattern images 22 formed on the transfer conveyor belt 8 by image forming units 21B, 21Y, 21M, and 21C. The pattern detection unit 20 has two pairs of light sources 23 and light receiving elements 24 disposed on both ends in the width direction of an image area of the transfer conveyor belt 8. The light sources 24 comprises LEDs for producing backlight required to detect the image position detection pattern images on the transfer conveyor belt 8. The light receiving elements 24 are disposed to oppose the light source 24 through the transfer covey belt 8.

Interface printed wiring substrates 25B, 25Y, 25M, and 25C send picture signals to the laser beam scanners in the image forming units 21B, 21Y, 21M, and 21C, respectively. Numeral 26 designates a correction printed wiring substrate for controlling a registration misalignment correction system. Numeral 27 designates an image processing printed wiring substrate for performing memory and image processing. A control printed wiring substrate 28 controls these printed wiring substrates and the entire operation of the digital color copier.

Figure 4:
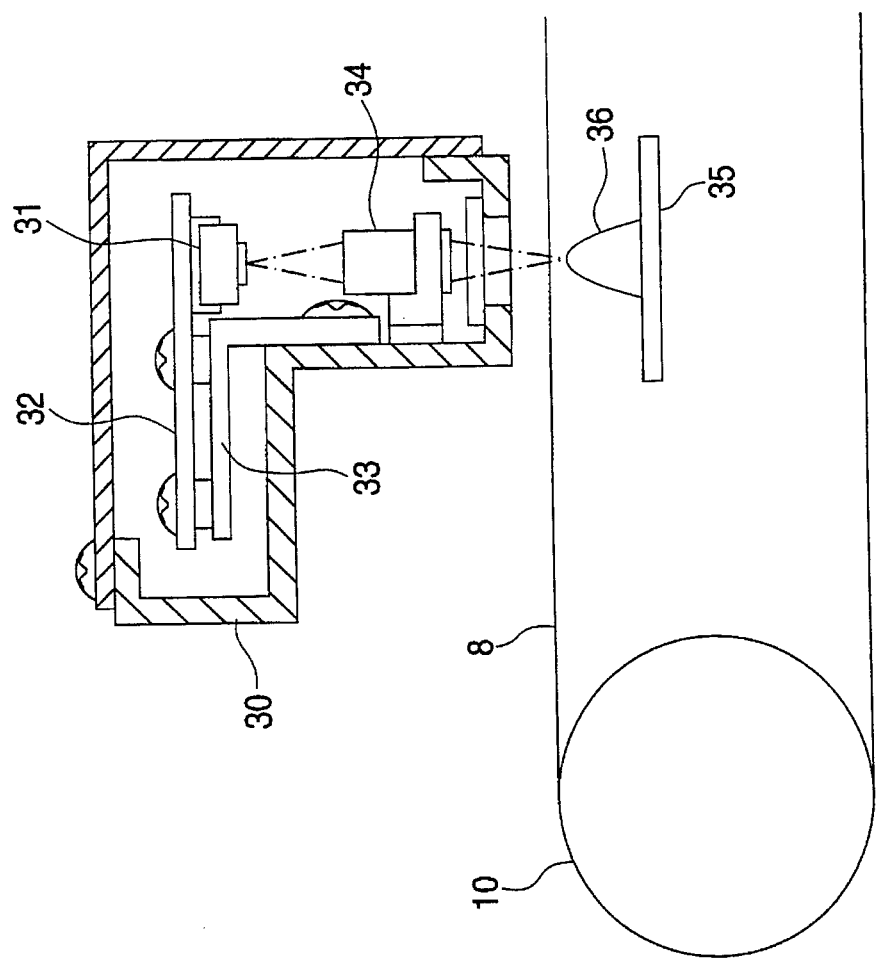
FIG. 4 is a drawing showing the structure of a sensor.

FIG. 4 is a sectional view showing the pattern detection unit for image position detection.

In FIG. 4, numeral 30 designates a case of the pattern detection unit, numeral 31 designates linear CCD as the light receiving element 24, and numeral 32 designates a printed wiring substrate on which the linear CCD 31 and peripheral circuitry for driving it are mounted. The printed wiring substrate 32 is attached to the case 30 through an angle 33 having an L-like section. Numeral 34 designates a lens array of refractive index distribution type and numeral 35 designates a printed wiring substrate on which a lighting source 36 as the light source 24 and peripheral circuitry for driving it are mounted.

Figure 5:
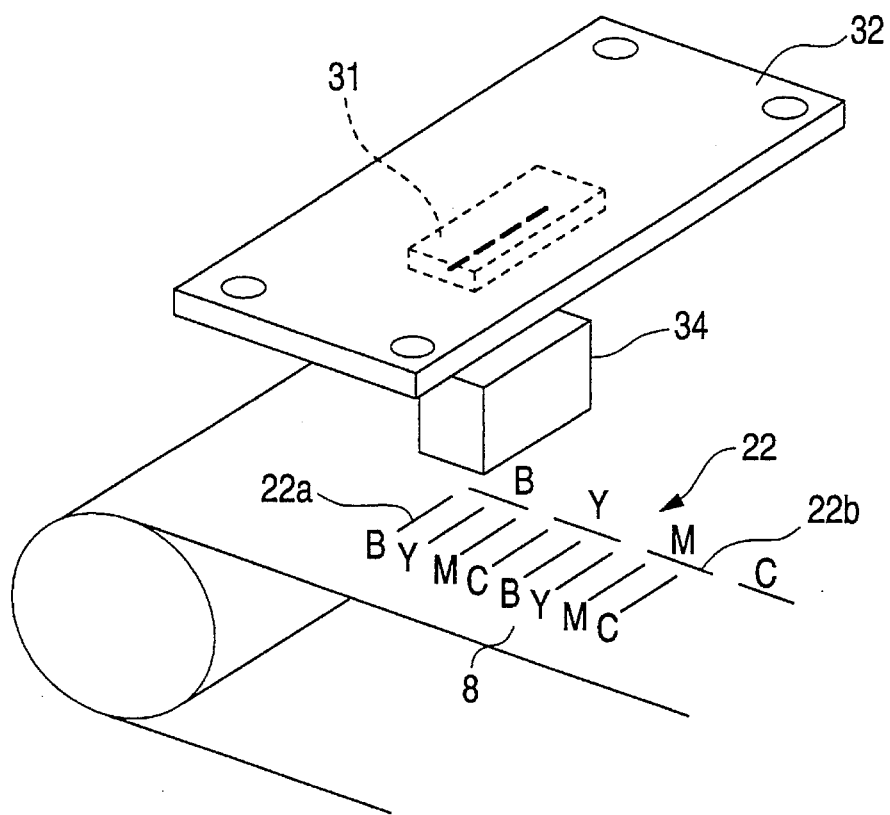
FIG. 5 is a perspective view showing the sensor in FIG. 4.

FIG. 5 shows the positional relationships among the sensor substrate 32, the refractive index distribution lens array 34, and the registration error detection pattern 22 on the transfer conveyor belt 8 in three dimensions. The case 30 contains two pairs of the sensor substrates 32 and the refractive index distribution lens arrays 34. Moreover, the case 30 is disposed on each end in the width direction in the image area of the transfer conveyor belt 8. The linear CCD 31 mounted on one of the sensor substrates 32 is adapted to detect both the fast and slow scanning directions of the registration error detection pattern 22 on the front side, and the linear CCD 31 mounted on the other sensor substrate 32 is adapted to detect both the fast and slow scanning directions of the registration error detection pattern 22 on the rear side. Thus, the two sensors enable adjustments of a color misalignment in all directions, such as shift in the fast and slow scanning directions around the center of a copy, magnification error in the fast and slow scanning directions, an angle shift with respect to the fast scanning direction and the like. However, only one detection sensor may be used if adjustment only in the fast scanning direction is made, for example. The case 30 containing the two sensors is disposed on each end in the width direction in the image area of the transfer conveyor belt 8.

Further, an LED is used as the lighting source 36. If one LED cannot provide a necessary lighting range, two or more LEDs may be used. For example, if one sensor CCD 31 detects a shift at the scanning start position of the laser beam scanner, namely, in the fast scanning direction and a shift in the transfer conveying direction, namely, in the slow scanning direction at comparatively near positions, one LED 36 may be located; if at comparatively distant positions, two LEDs 36 may be located. At the time, condensing LEDs 36 is brought near the transfer conveyor belt 8, thereby providing a lighting width substantially equal to the external forms of the LEDs. Since some LEDs go on, their power consumption can be suppressed to a very small value.

Figure 6:
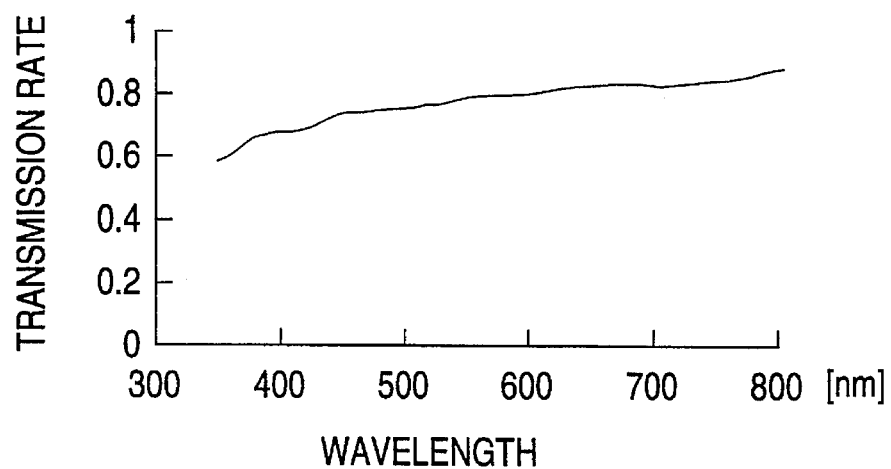
FIG. 6 is a graph showing the relationship between transmission rate and wavelength.
Figure 7:
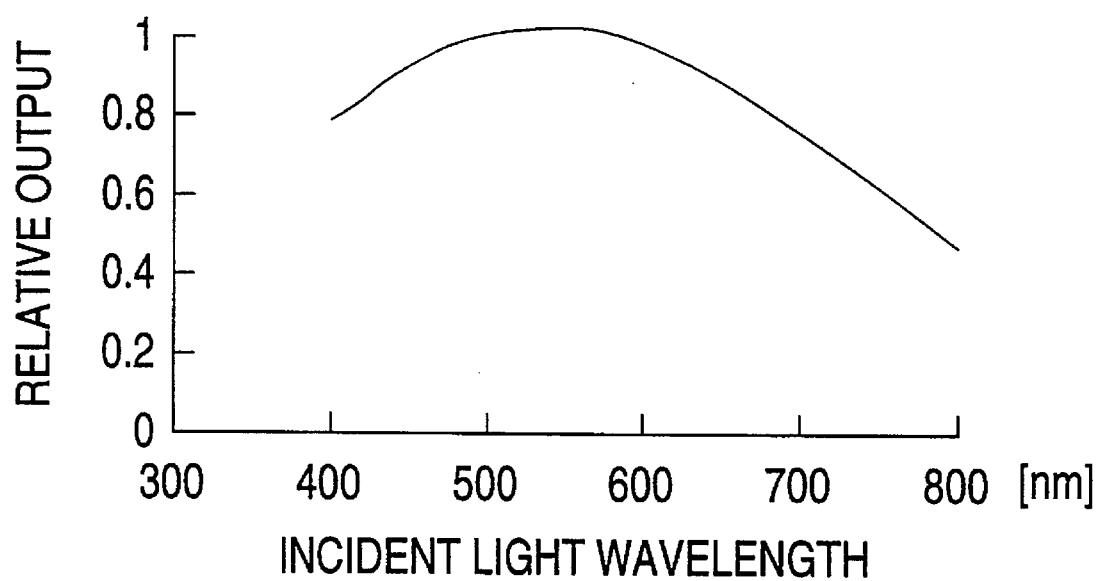
FIG. 7 is a graph showing the relationship between relative output of sensor and incident light wavelength.
Figure 9:
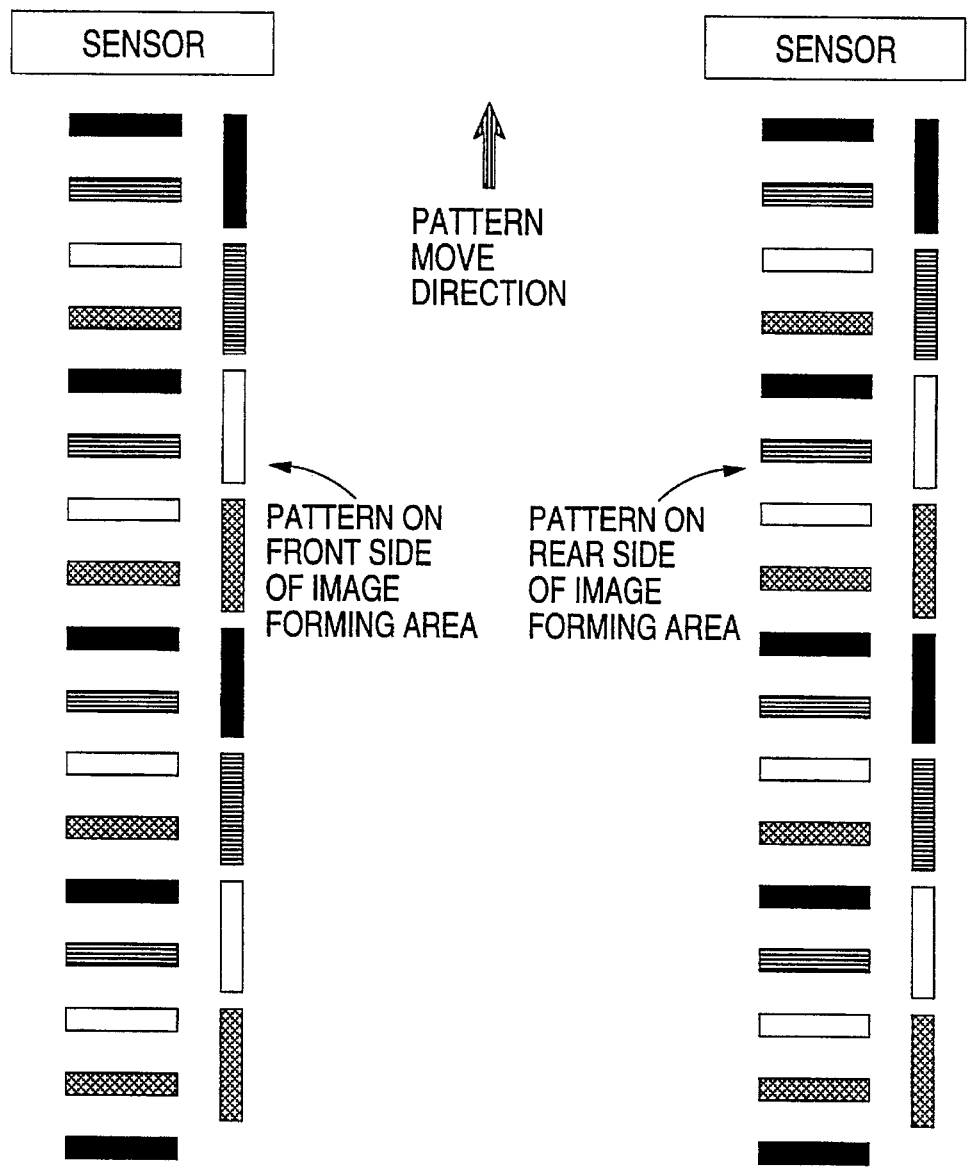
FIG. 9 is an illustration showing a registration misalignment measurement pattern.
Figure 10:
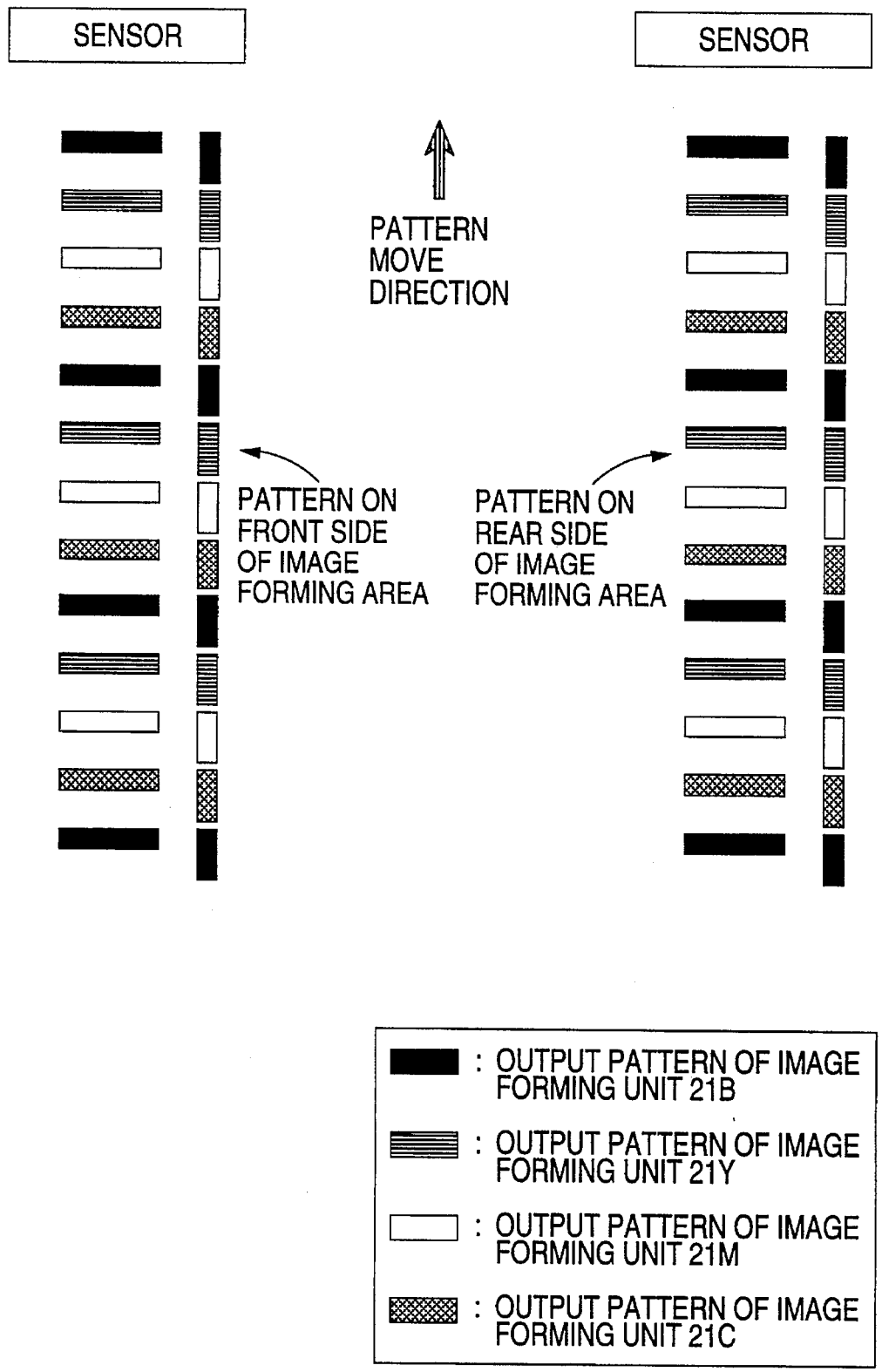
FIG. 10 is an illustration showing a registration misalignment measurement pattern.

In the embodiment, a transparent belt 8 made of, for example, PET (polyethyleneterephthalate) is used as the transfer conveyor unit. For typical transmission characteristics in this case, as the wavelength becomes longer, the corresponding transmission rate raises, as shown in FIG. 6. Typical sensitivity characteristics of the CCD 31 are shown in FIG. 7. The CCD 31 has good sensitivity in a visible light area. On the other hand, the light emitting wavelength of the CCD 31 for providing high brightness is a red area (600–700 nm). These can be combined to provide a large sensor output. When the pattern 22 on the transfer conveyor belt 8 arrives at a detection position, the transmission rate at the pattern detection position is near zero and sensor output becomes very small because toner forming the pattern 22 is opaque regardless of colors. The greater the sensor output difference, the stabler the detection. FIGS. 9 and 10 show output examples in the configuration, wherein substantially equal outputs can be provided for each color of B, Y, M and C.

Figure 1:
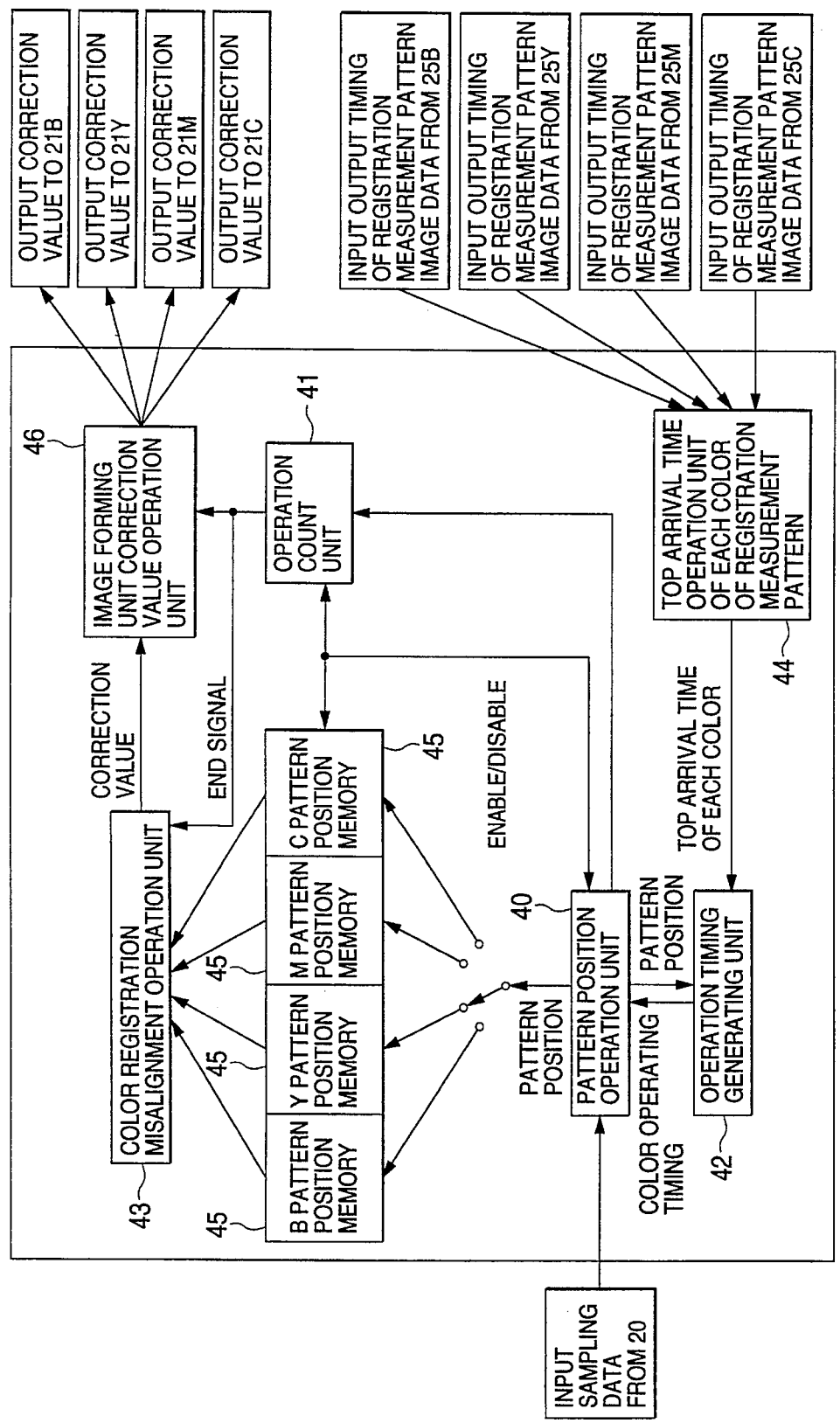
FIG. 1 is a block diagram showing a control circuit in one embodiment of a digital color copier for carrying out a color registration error correction method according to the invention.

FIG. 1 is a block diagram showing one embodiment of a control section of a color registration error detection device according to the invention. The control section is located in the correction substrate 26 shown in FIG. 3.

In FIG. 1, numeral 40 designates pattern position operation unit, numeral 41 is operation count unit, numeral 42 designates operation timing generation unit, numeral 43 designates color registration misalignment operation unit, numeral 44 designates top arrival time operation unit of each color of registration measurement pattern, numerals 45B, 45Y, 45M, and 45C designate pattern position memories corresponding to the colors B, Y, M, and C respectively, and numeral 46 designates image forming unit correction value operation unit.

The color registration error correction device according to the embodiment corrects a color registration error in the following manner. A correction mode based on detection of a color registration error is executed as required in the intervals of a normal image forming mode (print mode) in the digital color copier to which the color registration error correction device is applied.

In the color registration correction mode, as shown in FIG. 3, the control substrate 28 issues command to the sections and the interface substrates 25B, 25Y, 25M, and 25C start outputting registration measurement pattern image data in sequence to the corresponding image forming units 21B, 21Y, 21M, and 21C respectively by the registration measurement pattern output unit contained in the interface substrates. The timings at which the interface substrates 25B, 25Y, 25M, and 25C start outputting the image data are the same as those in the normal image forming mode (print mode). The image forming units 21B, 21Y, 21M, and 21C form predetermined patterns 22 based on the image data and perform multiple transfer to the transfer conveyor belt 8 in sequence at the same timings as the normal image forming mode (print mode) for forming a registration measurement pattern 22 on the transfer conveyor belt 8.

Figure 8:
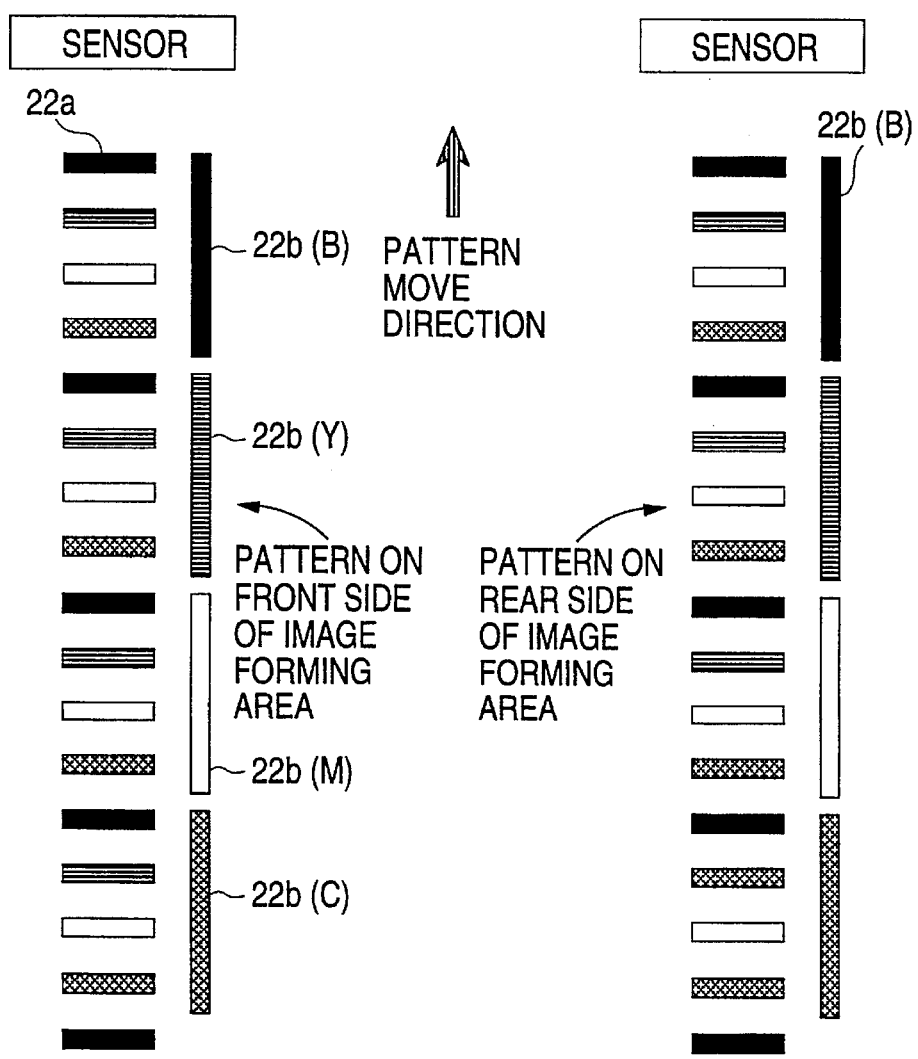
FIG. 8 is an illustration showing a registration misalignment measurement pattern.
Figure 8:
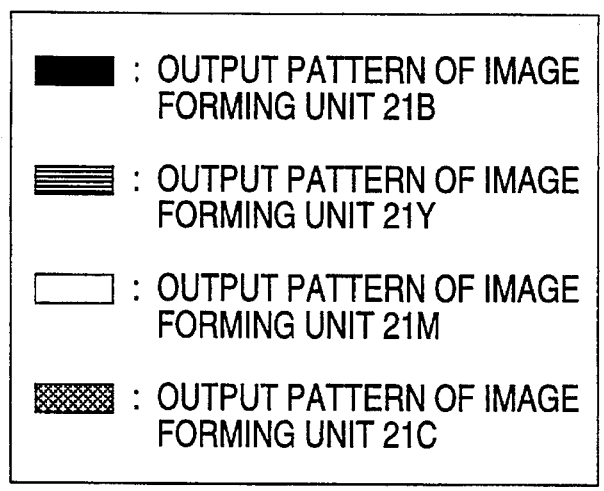

The registration measurement pattern 22 comprises, for example, a color registration measurement pattern 22b in the fast scanning direction and a color registration measurement pattern 22a in the slow scanning direction, as shown in FIG. 8. Two pairs of 22a and 22b are multiple-transferred to predetermined positions at which the patterns can be detected by the image position detection pattern detection unit 20 disposed on the front side and the rear side of the image forming units. Each of the color registration measurement patterns 22b and 22a in the fast and slow scanning directions comprises band patterns as line portions of the colors black (B), yellow (Y), magenta (M), and cyan (C) in sequence spaced from each other at predetermined intervals.

Figure 11:
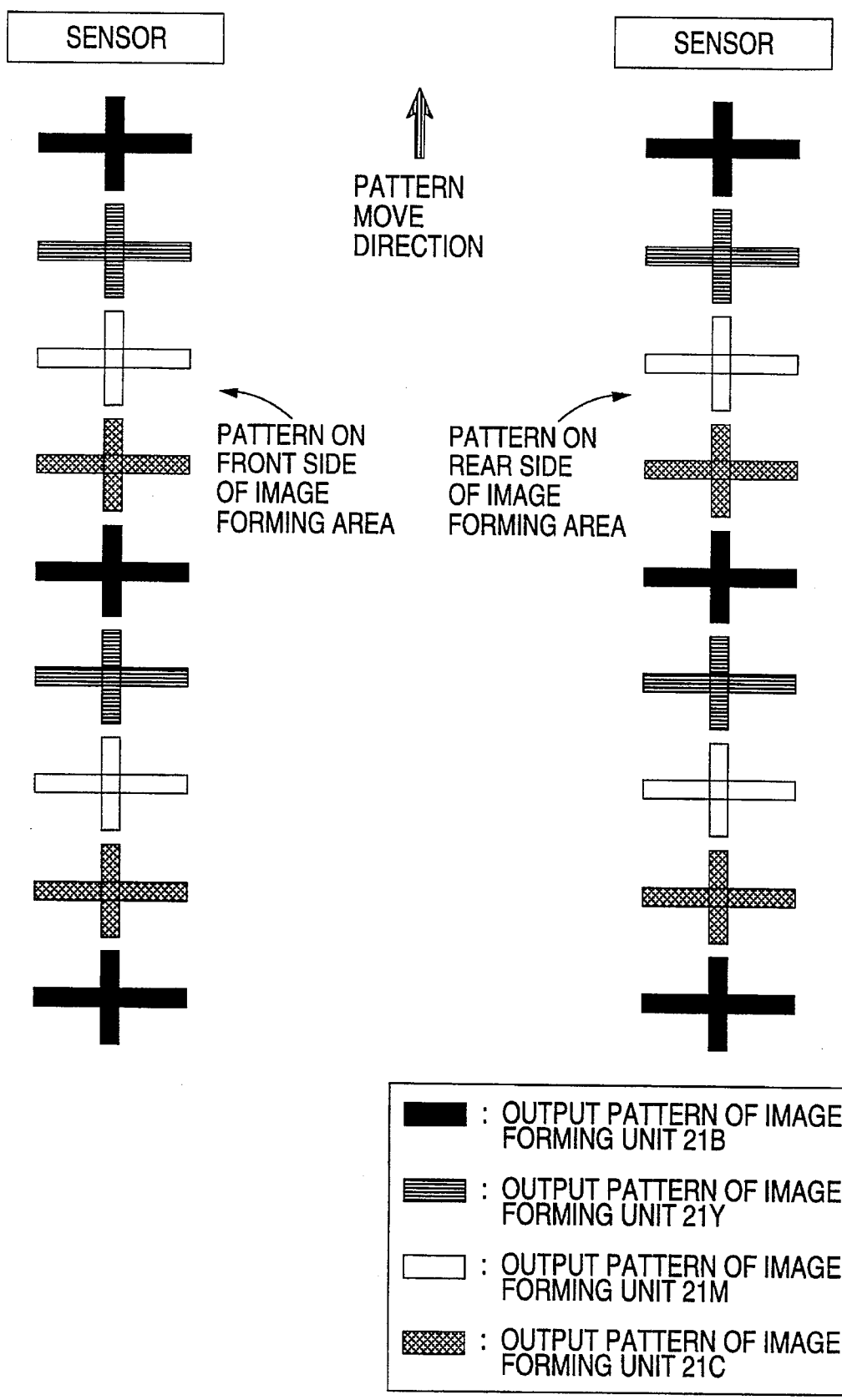
FIG. 11 is an illustration showing a registration misalignment measurement pattern.

In addition, registration measurement patterns 22, for example, as shown in FIGS. 9 to 11 are available. The registration measurement patterns 22 are characterized by the fact that line portions parallel to the slow scanning direction and line portions parallel to the fast scanning direction arrive at the detecting area of the pattern detection unit 20 in particular color order. The registration measurement patterns 22 have the following two advantages:

1) Long sensors are not required because the width of each of the patterns on the front and rear sides in the fast scanning direction is narrow.

2) Since color patterns do not overlap each other, a sensor can determine which color is detected even if the sensor is not color sensor.

In FIGS. 8 to 11, particular reference color is black (B).

Incidentally, the correction substrate 26 monitors the timings at which the interface substrates 25B, 25Y, 25M, and 25C start outputting registration measurement pattern data to their corresponding image forming units 21B, 21Y, 21M, and 21C in sequence and subsequently estimates and calculates the time based on the time at which each component pattern of the registration measurement pattern 22 comes just under the pattern detection unit 20 by the top arrival time operation unit 44 of each color of registration measurement pattern, as shown in FIG. 1. When the time is reached, the correction substrate 26 references sampling data provided by the pattern detection unit 20 sampling the registration measurement pattern 22 and causes the pattern position operation unit 40 contained in the correction substrate 26 to calculate the position of each component pattern of the registration measurement pattern 22. To ensure that the entire registration measurement pattern 22 is detected completely, the time at which each component pattern of the registration measurement pattern 22 comes just under the pattern detection unit 20 is estimated and calculated and the registration measurement pattern 22 is detected by the pattern detection unit 20.

Figure 12:
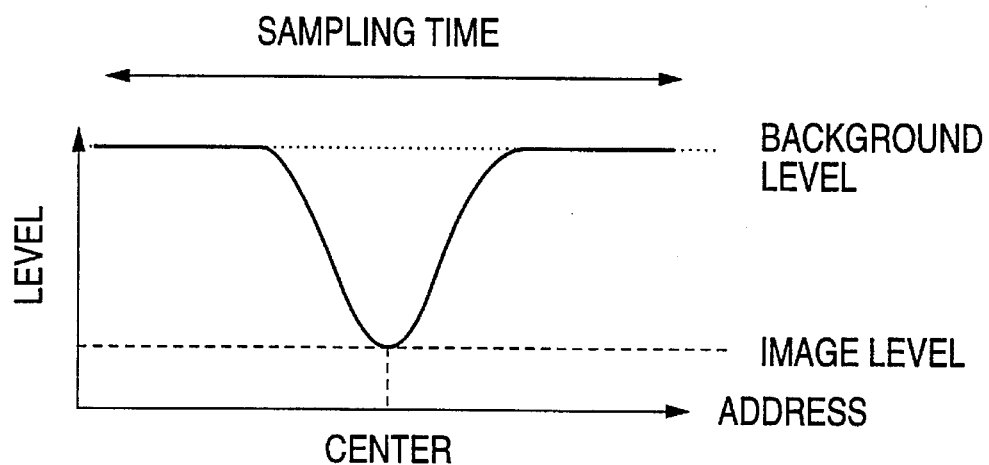
FIG. 12 is a graph showing a sensor output.
Figure 13:
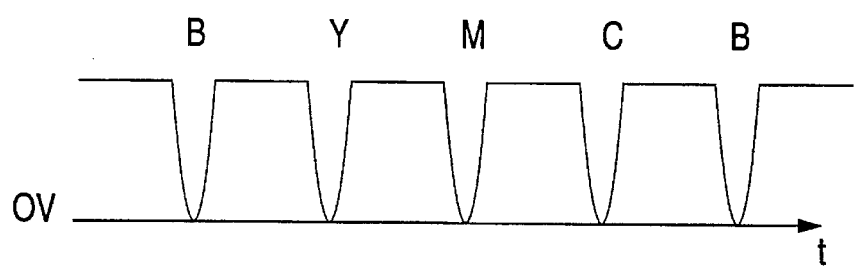
FIG. 13 is a graph showing a sensor output.

The sampling data given to the pattern position operation unit has a profile as shown in FIGS. 12 and 13, for example, and contains light quantity change made when each component pattern of the registration measurement pattern 22 crosses under the pattern detection unit 20. From the profile, the pattern position operation unit 40 calculates the center-of-gravity position or center position of the light quantity change, for example, and stores the pattern positions in the pattern position memories 45B, 45Y, 45M, and 45C corresponding to the particular colors B, Y, M and C. The correction substrate 26 repeats the steps until the operation count unit 41 contained in the correction substrate 26 counts the number of operations for each color to a predetermined count n (n+1 for particular reference colors in the slow scanning direction), for example, 4 and indicates the end of detecting the registration measurement pattern 22. The pattern position operation intervals are controlled by a timing signal generated by the operation timing generation unit 42 contained in the correction substrate 26. The pattern position operation intervals and registration 2measurement pattern spacing are adjusted, and then the interface substrates 25B, 25Y, 25M, and 25C previously output image data to their corresponding image forming units 21B, 21Y, 21M, and 21C.

The color registration misalignment operation unit 43 contained in the correction substrate 26 calculates color registration misalignment amounts from pattern positions of the colors thus calculated, then performs predetermined operations for calculating a color registration misalignment at high precision. Operations such as averaging, finding the maximum and minimum values and taking their center value, or taking the value around which most color registration misalignment amounts distribute are possible as the predetermined operations. Also, distribution and transition of the color registration misalignment amounts are observed and abnormal data (improper for calculating a color registration misalignment) is removed, then predetermined operations are performed, thereby calculating a color registration misalignment at high precision.

However, the color registration misalignment amount thus found contains a patten detecting unit error for the following reasons:

The following pattern detecting unit magnification errors are possible:

i) Variation or fluctuation in magnification in the optical system of the pattern detecting unit. It is extremely difficult to hold the magnification in the optical system to a predetermined constant value.

ii) If an array-like sensor, such as a CCD sensor, is adopted for the pattern detecting unit, variation or fluctuation in arrangement pitch of the sensor array.

iii) Magnification error occurring when the move speed of the registration misalignment measurement pattern deviates from the design value. It occurs only in the slow scanning direction.

These pattern detecting unit errors, as seen from the contents, can be reduced at some degree, but inevitably occur and the detecting errors themselves cannot be prevented from occurring. Therefore, if color registration misalignment correction operation is performed in response to the color registration misalignment amount obtained based on an error contained in the pattern detecting unit, there is a chance that the color registration misalignment may be enlarged instead of corrected.

Then, even if an error is contained in the pattern detecting unit as described above, an error is prevented from occurring in the found color registration misalignment amount in the embodiment as described below:

(1) Correction in fast scanning direction

First, color registration misalignment correction methods in the fast scanning direction are described in detail.

Either of the following two color registration misalignment correction methods may be selected according to the function required for the system:

The first correction method is described as follows. The color registration misalignment operation unit contained in the correction substrate 26 references the contents of position data of the color patterns stored in the pattern position memories and finds the difference between a predetermined position of the CCD sensor and each color pattern position in pixel units of the CCD sensor. At the time, if a plurality of color pattern positions are stored in the corresponding pattern position memory, the color pattern positions are averaged, then the color registration misalignment operation unit finds the difference between the predetermined position of the CCD sensor and each color pattern position in pixel units of the CCD sensor.

Figure 14:
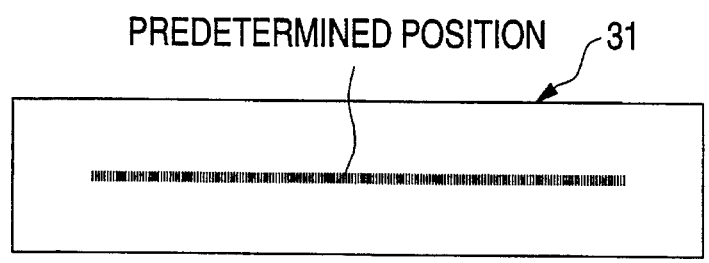
FIG. 14 is a schematic drawing showing sensor.

The predetermined position of the CCD sensor 31 is preset to a reference position of the CCD sensor, for example, as shown in FIG. 14, and is previously recorded in the color registration misalignment operation unit as data of the number of pixels. The color registration misalignment operation unit calculates the difference between the predetermined position of the CCD sensor and each color pattern position in pixel units of the CCD sensor.

Thus, the correction substrate 26 receives the difference between the predetermined position of the CCD sensor and each color pattern position and converts it into a correction value for correcting the corresponding image forming unit by the image forming unit correction value operation unit 46 contained in the correction substrate 26 and outputs the value to the image forming unit 21B, 21Y, 21M, 21C for setting. Then, again the correction substrate 26 writes the color registration misalignment pattern and detects a color registration misalignment amount. Based on the detection value of the second color registration misalignment amount, the correction substrate 26 converts it into a correction value for correcting the corresponding image forming unit by the image forming unit correction value operation unit 46 and outputs the value to the image forming unit 21B, 21Y, 21M, 21C for setting, then terminates the color registration misalignment correction mode.

Thus, the predetermined position of the CCD sensor 31 used as a reference for finding the color registration misalignment amount is fixed with the CCD sensor location as a reference and does not change. For this reason, by calculating a color registration misalignment with the predetermined position of the CCD sensor as a reference, even if the first found color registration misalignment amount contains the effect of variation or fluctuation in magnification in the optical system of the pattern detecting unit, the second color registration misalignment amount accurately reflects a shift or misalignment in the image forming unit positions, etc. Accordingly, a correction is made so that the second color registration misalignment amount becomes zero with the first found color registration misalignment amount as a reference, thereby converging the color, registration misalignment amount on a value substantially near zero.

For a second correction method, which is described as follows, assume that black (B) is used for the example as a particular reference color. The color registration misalignment operation unit contained in the correction substrate 26 references the contents of position data of the color patterns stored in the pattern position memories and finds the difference between a black (B) pattern position and each color pattern position in pixel units of the CCD sensor. At the time, if a plurality of color pattern positions are stored in the corresponding pattern position memory, the color pattern positions are averaged, then the color registration misalignment operation unit finds the difference between the black (B) pattern position and each color pattern position in pixel units of the CCD sensor.

Next, the correction substrate 26 converts the difference value between the black (B) pattern position and each color pattern position into a correction value for correcting the corresponding image forming unit by the image forming unit correction value operation unit 46 contained in the correction substrate and outputs the value to the image forming unit 21B, 21Y, 21M, 21C for setting. Then, again the correction substrate 26 writes the color registration misalignment pattern and detects a color registration misalignment amount. Based on the detection value of the second color registration misalignment amount, the correction substrate 26 converts it into a correction value for correcting the corresponding image forming unit by the image forming unit correction value operation unit 46 and outputs the value to the image forming unit 21B, 21Y, 21M, 21C for setting, then terminates the color registration misalignment correction mode.

Thus, the black (B) pattern position used as a reference for finding the color registration misalignment amount is fixed with the black image forming unit location as a reference and does not change. For this reason, even if the first color registration misalignment amount found by calculating a color registration misalignment with the black (B) pattern position as a reference contains the effect of variation or fluctuation in magnification in the optical system of the pattern detecting unit, the second color registration misalignment amount accurately reflects a shift, misalignment in the image forming unit positions or the like. Accordingly, a correction is made so that the second color registration misalignment amount becomes zero with the first found color registration misalignment amount as a reference, thereby converging the color,registration misalignment amount on a value substantially near zero.

Now, it is assumed that variation or fluctuation in magnification in the optical system of the pattern detecting unit exists in the fast scanning direction and the CCD sensor contains variation or fluctuation in arrangement pitch of the sensor array. When the two sources each have a magnification fluctuation of 1% and the color registration misalignment is 10 mm and a correction is made by the first or second correction method, the two sources each having a magnification fluctuation of 1% appear in the color registration misalignment amount detection value as an error and the color registration misalignment amount after the correction becomes about 200 μm as the detection error appears intact. However, if another correction is made by the first or second correction method, the color registration misalignment amount is reduced to 2% (about 4 μm), meaning that the correction is substantially complete. Since a color registration correction at the color image forming apparatus generally is executed before the color registration misalignment exceeds about 100 μm, suppressing the color registration misalignment amount to about 4 μm means that extremely accurate correction can be made, indicating that the magnification error in the optical system of the pattern detecting unit has a little or no effect.

(2) Correction in slow scanning direction

Next, a color registration misalignment correction method in the slow scanning direction is described by taking black (B) as a particular reference color as an example. The color registration misalignment operation unit contained in the correction substrate 26 references the pattern position memory contents and finds R2

$$R2=\{\Sigma(T_{1j+1}-T_{1j})/n\}/\{\Sigma(T_{2j}-T_{1j})/n\}= (T_{1,n+1}-T_{1,1})/\{\Sigma(T_{2j}-T_{1j})\}$$

where $\Sigma$ takes j=1 to n;

$T_{1j}$ is the time at which the jth line portion of black (B) arrives at the detecting unit;

$T_{2j}$ is the time at which the jth line portion of yellow (Y) arrives at the detecting unit;

n is the number of detecting repetitions per color and a predetermined positive integer determined by the number of registration measurement pattern repetitions, for example, 4. Likewise, the color registration misalignment operation unit finds R3 by assuming that $T_{3j}$ is the time at which the jth line portion of magenta (M) arrives at the pattern detecting unit and R4 by assuming that $T_{4j}$ is the time at which the jth line portion of cyan (C) arrives at the pattern detecting unit, and finds the differences between R2, R3, and R4 and the values to be taken by R2, R3, and R4 when no color registration misalignment exists (found from the setup value of registration measurement pattern move speed, image forming unit layout, etc.,). Next, the correction substrate 26 converts the difference values into correction values for correcting the image forming units except the black image forming unit by the image forming unit correction value operation unit 46 and outputs the values to the image forming units 21Y, 21M, and 21C for setting, then terminates the color registration misalignment correction mode.

Thus, the black (B) pattern position used as a reference for finding the color registration misalignment amount is fixed with the black image forming unit location as a reference and does not change. For this reason, by calculating a color registration misalignment with the black (B) pattern position as a reference, even if the first found color registration misalignment amount contains the effect of variation or fluctuation in magnification in the optical system of the pattern detecting unit, the second color registration misalignment amount accurately reflects a shift or misalignment in the image forming unit positions, etc. Accordingly, a correction is made so that the second color registration misalignment amount becomes zero with the first found color registration misalignment amount as a reference, thereby converging the color registration misalignment amount on a value substantially near zero.

Now, it is assumed that a magnification error is caused by the fact that the registration measurement pattern move speed deviates from the design value in the slow scanning direction. When the source has a magnification error of 1% and the color registration misalignment is 10 mm and a correction is made by the correction method, the color registration misalignment becomes about 100 μm. Next, when another correction is made by the correction method, the color registration misalignment is reduced to about 1 μm. Since a color registration correction generally is executed before the color registration misalignment exceeds about 100 μm, suppressing the color registration misalignment to about 1 μm unit that extremely accurate correction can be made, indicating that the magnification error has a little or no effect.

Next, a second embodiment of the invention will be discussed as follows. Parts identical with or similar to those previously described in the first embodiment are denoted by the same reference numerals in the second embodiment. In the second embodiment, a color registration misalignment correction system as described in the fist embodiment is provided with a diagnosis function which checks whether or not the color registration misalignment detection operation and correction operation are performed normally.

A digital color copier to which the color registration misalignment correction system is applied can correct a color registration misalignment to provide a high picture quality. However, once an error occurs in the operation of the color registration misalignment detection device or correction device, it is difficult to locate fault points and the copier cannot be repaired for a short time because the configuration and operation of the color registration misalignment detection device and correction device are very complicated.

In order to solve the problem, it is considered to develop a device for diagnosing the fault of the color registration misalignment detection device and correction device, which is built in the digital color copier, or to develop such a diagnosis device, only the interface device of which is built in the digital color copier.

However, if the diagnosis device to diagnosing the fault of the complicated color registration misalignment detection device and correction device is built in the digital color copier, it would drastically increase the cost of the copier; if only the interface device is built in the digital color copier, the diagnosis device has to be brought to the user.

Then, in the second embodiment, the color registration misalignment detection device and correction device can be diagnosed for operation without adding a new mechanism.

First, a diagnosis method of a color registration misalignment detecting mechanism is discussed with a particular monocolor as black (B).

Figure 15:
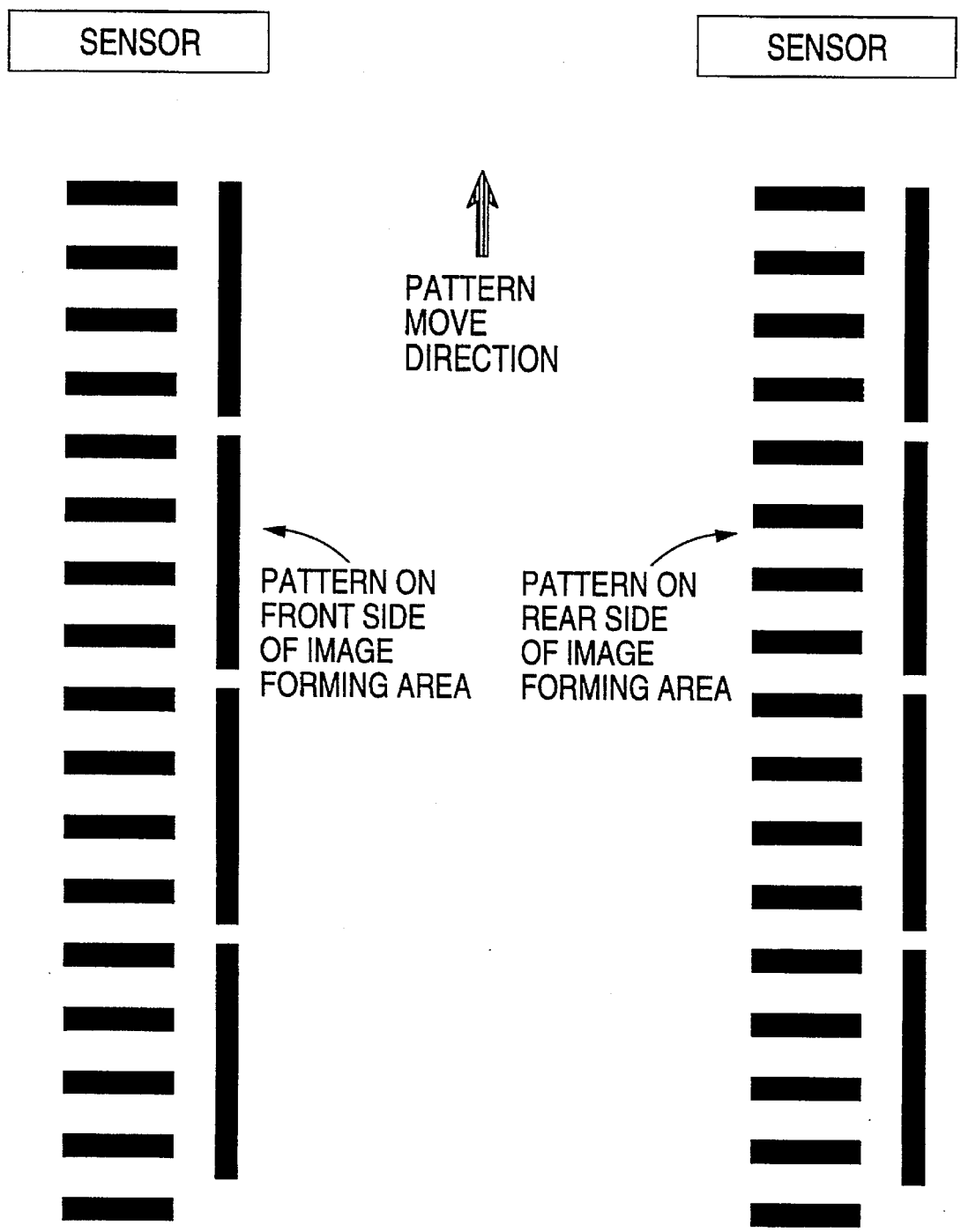
FIG. 15 is an illustration showing a registration misalignment measurement pattern.
Figure 16:
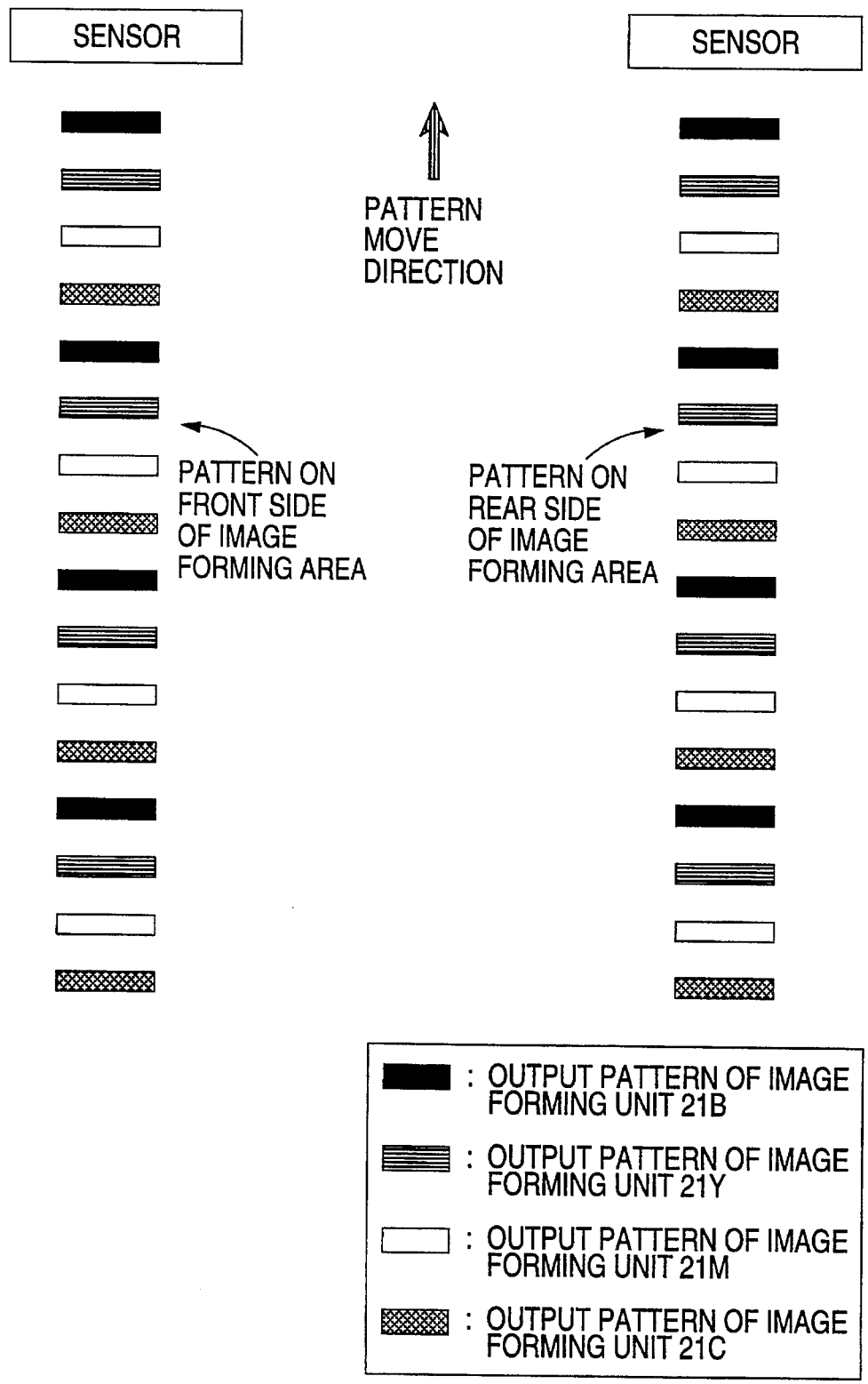
FIG. 16 is an illustration showing a registration misalignment measurement pattern.
Figure 17:
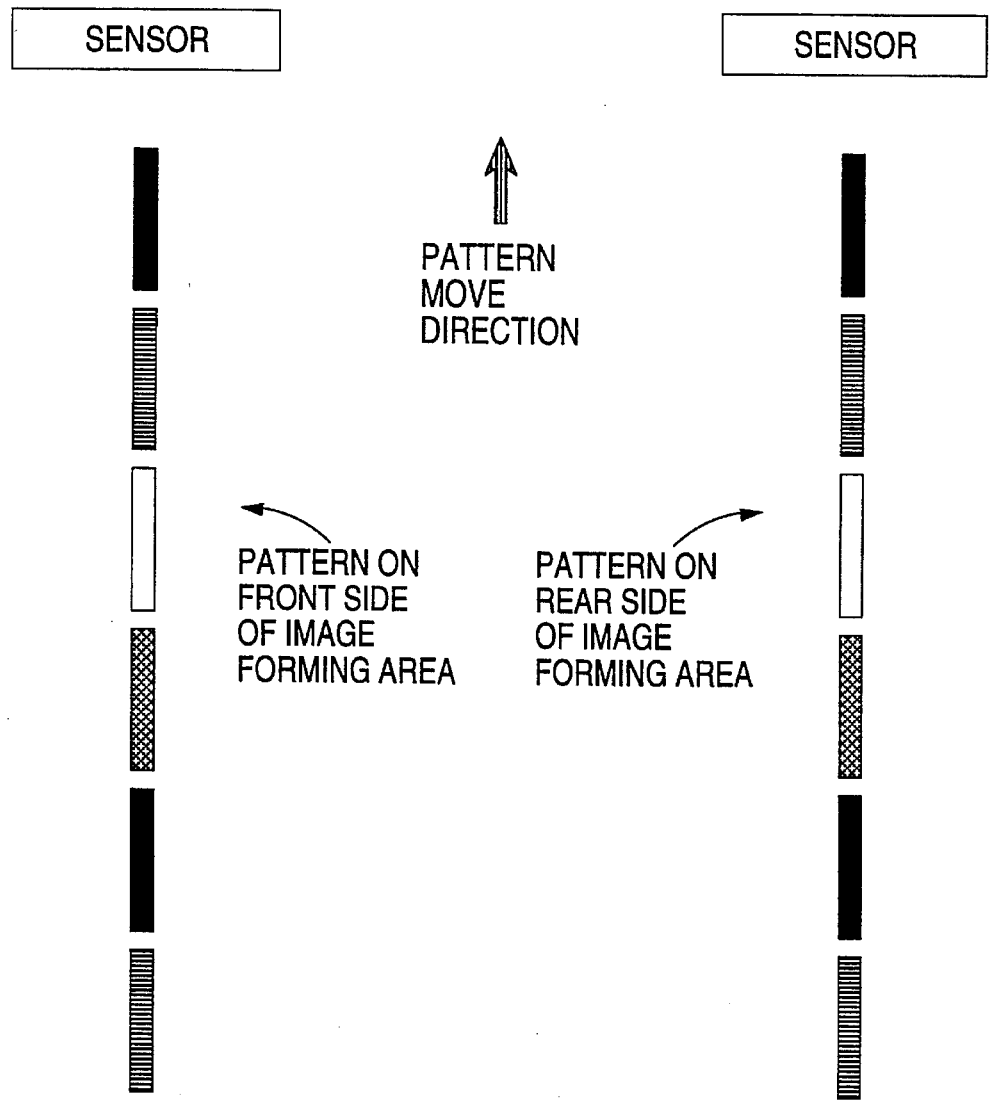
FIG. 17 is an illustration showing a registration misalignment measurement pattern.
Figure 17:
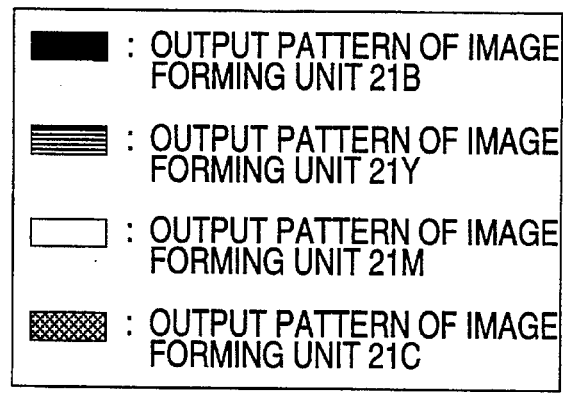
Figure 18:
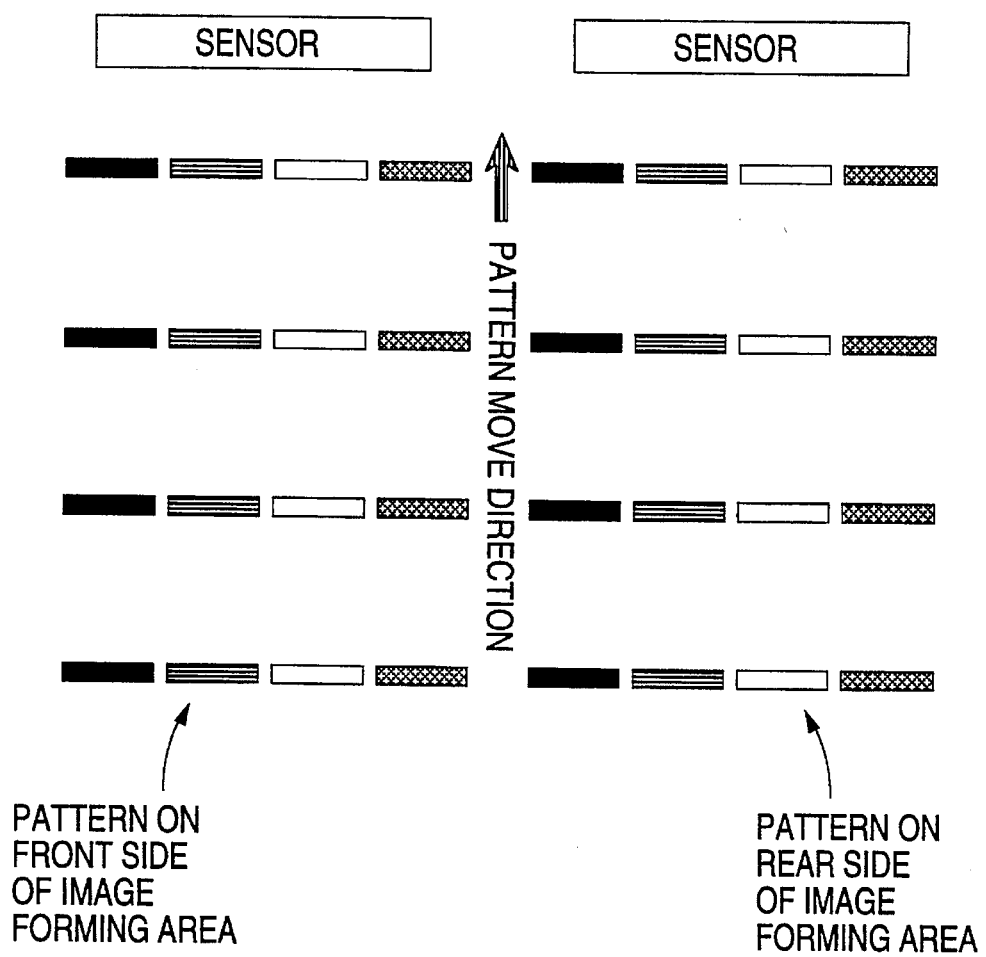
FIG. 18 is an illustration showing a registration misalignment measurement pattern.
Figure 18:
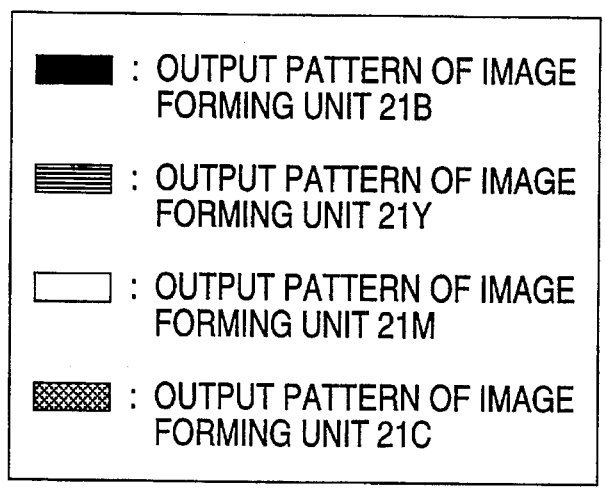

In a diagnosis mode of the color registration misalignment detecting mechanism, as shown in FIG. 3, the control substrate 28 issues a command indicating the color registration misalignment detecting mechanism diagnosis mode to each section. In the mode, only blocks related to the particular monocolor operate. The black interface substrate 25B starts outputting image data of a pattern, as shown in FIG. 15, provided by drawing the registration measurement pattern shown in FIG. 8 in one color of black to the corresponding image forming unit 21B by the registration measurement pattern output unit contained in the interface substrate. The timing at which the interface substrate 25B starts outputting the image data is the same as that in the normal image forming mode (print mode). The image forming unit 21B forms predetermined patterns 22 based on the image data and performs multiple transfer to the transfer conveyor belt 8 in sequence at the same time as the normal image forming mode (print mode) for forming a registration measurement pattern 22 on the transfer conveyor belt 8.

Incidentally, the correction substrate 26 monitors the timing at which the interface substrate 25B starts outputting registration measurement pattern image data to the corresponding image forming unit 21B in sequence and subsequently estimates and calculates from the timing the time at which the top of the registration measurement pattern 22 comes just under the pattern detection unit 20 by the top arrival time operation unit 44 of each color of registration measurement pattern, as shown in FIG. 1. When the time is reached, the correction substrate 26 references sampling data provided by the pattern detection unit 20 sampling the registration measurement pattern 22 and causes the pattern position operation unit 40 contained in the correction substrate 26 to calculate the position of each component pattern of the registration measurement pattern 22.

The sampling data given to the pattern position operation unit has a profile as shown in FIGS. 12 and 13, for example, and includes light quantity change made when each component pattern of the registration measurement pattern 22 crosses under the pattern detection unit 20. From the profile, the pattern position operation unit 40 calculates the center-of-gravity position or center position of the light quantity change, for example, and stores the pattern positions in the pattern position memories 45B, 45Y, 45M, and 45C corresponding to the particular colors B, Y, M and C.

This operation is the same as the operation of the color registration misalignment correction mode except that the registration measurement pattern shown in FIG. 15 rather than in FIG. 8 is used. Therefore, the image positions of the pattern components represented as Y, M, and C in FIG. 8 and as B in FIG. 15 are stored in the pattern position memories 45Y, 45M, and 45C.

The correction substrate 26 repeats the steps until the operation count unit 41 contained in the correction substrate 26 counts the number of operations for each color to a predetermined count n (n+1 for particular reference colors in the slow scanning direction), for example, 4 and indicates the end of detecting the registration measurement pattern 22. The pattern position operation intervals are controlled by a timing signal generated by the operation timing generation unit 42 contained in the correction substrate 26.

The color registration misalignment operation unit 43 contained in the correction substrate 26 calculates color registration misalignment amounts from the pattern positions thus calculated. If they become about zero, the color registration misalignment detecting mechanism is judged normal; if they do not become about zero, it is judged abnormal. This feature uses the fact that patterns drawn in monocolor do not shift in principle.

The color registration misalignment detecting mechanism diagnosis method features a highly precise diagnosis by using only the functions of the color registration misalignment detecting mechanism.

Next, a diagnosis method of a color registration misalignment correction device will be discussed as follows.

In a diagnosis mode of the color registration misalignment correction device, as shown in FIG. 3, the control substrate 28 issues a command indicating the color registration misalignment correction device diagnosis mode to each section. The color interface substrates 25B, 25Y, 25M, and 25C start outputting image data of the registration measurement pattern shown in FIG. 8 to the corresponding image forming units 21B, 21Y, 21M, and 21C by the registration measurement pattern output unit contained in the interface substrates. The timings at which the interface substrates 25B, 25Y, 25M, and 25C start outputting the image data are the same as those in the normal image forming mode (print mode) and in the color registration alignment correction mode. The image forming units 21B, 21Y, 21M, and 21C form predetermined patterns 22 based on the image data and perform multiple transfer to the transfer conveyor belt 8 in sequence at the same timings as the normal image forming mode (print mode) for forming a registration measurement pattern 22 on the transfer conveyor belt 8.

Incidentally, the correction substrate 26 monitors the timings at which the interface substrates 25B, 25Y, 25M, and 25C start outputting registration measurement pattern image data to the corresponding image forming units 21B, 21Y, 21M, and 21C in sequence and subsequently estimates and calculates from the timings the time at which the top of the registration measurement pattern 22 comes just under the pattern detection unit 20 by the top arrival time operation unit 44 of each color of registration measurement pattern, as shown in FIG. 1. When the time is reached, the correction substrate 26 references sampling data provided by the pattern detection unit 20 sampling the registration measurement pattern 22 and causes the pattern position operation unit 40 contained in the correction substrate 26 to calculate the position of each component pattern of the registration measurement pattern 22.

The sampling data given to the pattern position operation unit has a profile as shown in FIGS. 12 and 13, for example, and contains light quantity change made when each component pattern of the registration measurement pattern 22 crosses under the pattern detection unit 20. From the profile, the pattern position operation unit 40 calculates the center-of-gravity position or center position of the light quantity change, for example, and stores the pattern positions in the pattern position memories 45B, 45Y, 45M, and 45C corresponding to the particular colors B, Y, M and C.

The correction substrate 26 repeats the steps until the operation count unit 41 contained in the correction substrate 26 counts the number of operations for each color to a predetermined count n (n+1 for particular reference colors in the slow scanning direction), for example, 4 and indicates the end of detecting the registration measurement pattern 22. The pattern position operation intervals are controlled by a timing signal generated by the operation timing generation unit 42 contained in the correction substrate 26.

The color registration misalignment operation unit 43 contained in the correction substrate 26 calculates color registration misalignment amounts from the pattern positions thus calculated, and stores them in a first color registration misalignment amount memory.

Next, the correction substrate 26 calculates correction values for correcting the image forming units 21B, 21Y, 21M, and 21C by the image forming unit correction value operation unit so that the color registration misalignment further increases by a predetermined amount, and outputs the correction values to the image forming units 21B, 21Y, 21M, and 21C for correction.

Then, the correction substrate 26 again outputs the registration measurement pattern shown in FIG. 8, detects it, calculates the color registration misalignment amount, and stores it in a second color registration misalignment amount memory. The correction substrate 26 finds the difference between the second color registration misalignment amount and the first color registration misalignment amount, and if the difference substantially equals the predetermined incremental amount of color registration misalignment, diagnoses the color registration misalignment correction device as normal; if the difference is not substantially equal, diagnoses the color registration misalignment correction device as abnormal.

The color registration misalignment correction device diagnosis method features a highly precise diagnosis by using only the functions of the color registration misalignment correction device.

Other configuration and functions are the same as in the first embodiment and therefore will not be discussed again.

Thus, the invention can show a color registration misalignment correction method not affected by a magnification error of pattern detecting unit or the like and provide a color registration error detection method whereby color registration misalignment correction accuracy can be improved.

What is claimed is:

1. A method of correcting a color registration error comprising the steps of:

forming a plurality of registration error detecting patterns parallel to a fast scanning direction, said patterns comprising a plurality of sets each of which patterns having different predetermined colors and being disposed to each other in sequence, in which the number of said patterns of a particular color of said predetermined color is at least n+1, where n is a predetermined positive integer, and the number of said patterns of any other color is at least n;

transferring said patterns on a pattern transfer member;

detecting positions of said patterns on said pattern transfer member;

correcting the color registration error so that $R_j$ becomes equal to a predetermined value when no color registration errors exist in the colors, wherein $$R_j = \{\Sigma(T_{1,j+1} - T_{1,j})/n\}/\{\Sigma(T_{i,j} - T_{1,j})/n\} = (T_{1,n+1} - T_{1,1})/\{\Sigma(T_{i,j} - T_{1,j})\}$$

where $\Sigma$ occurs for the range of j=1 to j=n;

$T_{1,j}$ is the time at which a jth line portion of the particular color arrives at said pattern detecting means; and $T_{i,j}$ is the time at which a jth line portion of any other color arrives at said pattern detecting means, where i is the number of colors and an integer of 2 or more.

2. A method of correcting a color registration error according to claim 1, further comprising:

repeating the steps of forming, transferring, detecting, and correcting.

3. An image forming apparatus capable of correcting a color registration error, comprising:

a plurality of image forming units each of which includes electric latent image supporting means, pattern forming means for forming a plurality of patterns on said plurality of electric latent image supporting means in one color, and transferring means for transferring said plurality of patterns;

endless transparent paper conveying means being provided to oppose said electric latent image supporting means for conveying transparent paper, on which said plurality of patterns are transferred by said transferring means;

detecting means mounted at a fixed position in said apparatus for detecting a position of each of said patterns on said endless transparent paper conveying means;

position storing means for storing information with respect to said fixed position of said detecting means;

comparing means for comparing said detected position of said patterns with said information stored in said position storing means to output comparing information which is a result of the comparing; and correcting means for correcting a pattern forming timing of said pattern forming means based on said comparing information.

4. An image forming apparatus according to claim 3, further comprises:

detecting mechanism diagnosis command means for issuing a command which indicates a color registration misalignment detecting mechanism diagnosis mode;

means for making one of said pattern forming means form said plurality of patterns based on said command; and judging means for judging whether said detecting means is normal or abnormal based on said comparing information.

5. An image forming apparatus according to claim 3, wherein each of said plurality of image forming unit forms said plurality of patterns in a color of predetermined colors.

6. An image forming apparatus according to claim 5, wherein said plurality of patterns comprises a plurality of sets in each of which band-like patterns having different colors of said predetermined colors each other are disposed in sequence to be spaced from each other at predetermined intervals.

7. An image forming apparatus according to claim 6, wherein said plurality of patterns comprises a plurality of patterns for a fast scanning direction each of which is longer in a slow scanning direction than in said fast scanning direction and parallel with said slow scanning direction.

8. An image forming apparatus according to claim 7, wherein said plurality of patterns further comprises a plurality of patterns for said slow scanning direction each of which is longer in said fast scanning direction than in said slow scanning direction and parallel with said fast scanning direction.

9. An image forming apparatus according to claim 5, wherein said correcting means comprises:

monitor means for monitoring the timings at which each of said image forming unit starts outputting the image data of said patterns to transfer said patterns on said conveying means;

top arrival time operation means for estimating and calculating a time based on said timings at which each pattern of said patterns comes just to said detecting means;

pattern position operation means for calculating the position of each pattern of said patterns; and color registration misalignment operation means for calculating color registration misalignment amounts from said calculated pattern positions of each color and calculating registration misalignment of each color.

10. An image forming apparatus capable of correcting a color registration error, comprising:

a plurality of image forming units each of which includes electric latent image supporting means, pattern forming means for forming a plurality of patterns on said plurality of electric latent image supporting means, and transferring means for transferring said plurality of patterns;

endless transparent paper conveying means being provided to oppose said electric latent image supporting means for conveying transparent paper, on which said plurality of patterns are transferred by said transferring means;

detecting means mounted at a fixed position in said apparatus for detecting a position of said pattern on said endless transparent paper conveying means;

difference information detecting means for detecting difference information between one of positions of said plurality of patterns and any other pattern; and correcting means for correcting a pattern forming timing of said pattern forming means based on said difference information.

11. An image forming apparatus according to claim 10, further comprises:

command means for issuing a command which indicates a color registration misalignment detecting mechanism diagnosis mode;

means for making one of said pattern forming means form said plurality of patterns based on said command; and judging means for judging whether said detecting means is normal based on said comparing information.

12. An image forming apparatus according to claim 10, wherein each of said plurality of image forming units forms said plurality of patterns in a color of predetermined colors.

13. An image forming apparatus according to claim 12, wherein said plurality of patterns comprises a plurality of sets in each of which band-like patterns having different colors of said predetermined colors each other are disposed in sequence to be spaced from each other at predetermined intervals.

14. An image forming apparatus according to claim 13, wherein said plurality of patterns comprises a plurality of patterns for a fast scanning direction each of which is longer in a slow scanning direction than in said fast scanning direction and parallel with said slow scanning direction.

15. An image forming apparatus according to claim 14, wherein said plurality of patterns further comprises a plurality of patterns for said slow scanning direction each of which is longer in said fast scanning direction than in said slow scanning direction and parallel with said fast scanning direction.

16. An image forming apparatus according to claim 12, wherein said correcting means comprises:

monitor means for monitoring the timings at which each of said image forming unit starts outputting the image data of said patterns to transfer said patterns on said conveying means;

top arrival time operation means for estimating and calculating a time based on said timings at which each pattern of said patterns comes just to said detecting means;

pattern position operation means for calculating the position of each pattern of said patterns; and color registration misalignment operation means for calculating color registration misalignment amounts from said calculated pattern positions of each color and calculating registration misalignment of each color.

17. An image forming apparatus capable of correcting a color registration error comprising:

a plurality of image forming units for forming an image having one of predetermine colors each other, each of which includes electric latent image supporting means, pattern forming means for forming a plurality of patterns on said plurality of electric latent image supporting means, and transferring means for transferring said plurality of patterns having one of said predetermined colors, wherein said patterns comprises a plurality of sets in each of which patterns having different colors of said predetermined colors different from each other are disposed in sequence;

endless transparent paper conveying means being provided to oppose said electric latent image supporting means for conveying transparent paper, on which said plurality of patterns are transferred by said transferring means;

detecting means for detecting a position of said pattern on said endless transparent paper conveying means; and correcting means for correcting a pattern forming timing of said pattern forming means based on the sum total of a difference of a detecting time between a particular color being one of said colors of adjacent repetitions and the sum total of a difference between said particular color and any other color in same repetition.

18. An image forming apparatus according to claim 17, wherein one of said image forming units forms at least n+1 (where n is a predetermined positive integer) patterns of a particular color of said predetermined color and any other image forming units form at least n patterns of any other color, and said correcting means corrects a color registration error so that $R_j$ becomes equal to a predetermined value when no color registration errors exist in the colors, in which $$R_j = \{\Sigma(T_{1,j+1} - T_{1,j})/n\}/\{\Sigma(T_{i,j} - T_{1,j})/n\} = (T_{1,n+1} - T_{1,1})/\{\Sigma(T_{i,j} - T_{1,j})\}$$

where $\Sigma$ occurs for the range of j=1 to j=n;

$T_{1,j}$ is the time at which a jth particular color arrives at said detecting means; and $T_{1,j}$ is the time at which a jth any other color arrives at said detecting means, where i is the number of color and an integer of 2 or more.

19. An image forming apparatus according to claim 17, further comprises:

command means for issuing a command which indicates a color registration misalignment detecting mechanism diagnosis mode;

means for making one of said pattern forming means form said plurality of patterns based on said command; and judging means for judging whether said detecting means is normal based on said comparing information.

20. A method of diagnosing a color detecting system for an image forming apparatus capable of correcting a color registration error comprising the steps of:

issuing a command which indicates a color registration misalignment detecting system diagnosis mode;

making one of a plurality of pattern forming unit form a plurality of patterns based on said command;

transferring said patterns on a pattern transferred member;

detecting pattern positions of said patterns one by one;

calculating color registration misalignment amounts from the detected pattern positions; and diagnosing whether a color registration misalignment detecting system is normal or abnormal based on the calculated color registration misalignment amounts;

wherein if the calculated amounts become about zero, the color registration misalignment detecting system is diagnosed as normal, or if the calculated amounts do not become about zero, the system is diagnosed as abnormal.

21. A method of diagnosing a color correcting system for an image forming apparatus capable of correcting a color registration error comprising the steps of:

issuing a command which indicates a color registration misalignment correcting system diagnosis mode;

making a plurality of pattern forming units form a plurality of first patterns based on said command, each of said pattern forming units forming said first patterns in a different color, to transferring said first patterns on a pattern transferred member;

detecting first pattern positions of said first patterns one by one;

calculating first color registration misalignment amounts from the detected first pattern positions;

storing the calculated first color registration misalignment amounts;

calculating correction values for correcting the image forming units so that the color registration misalignment further increases by a predetermined amount;

correcting the pattern forming units based on the calculated correcting values;

making the corrected pattern forming units form a plurality of second patterns to transferring said second patterns on the pattern transferred member;

detecting second pattern positions of said second patterns one by one;

calculating second color registration misalignment amounts from the detected second pattern positions;

finding a difference between the second color registration misalignment amount and the first color registration misalignment amount; and diagnosing whether a color registration misalignment correcting system is normal or abnormal based on the found difference;

wherein if the difference substantially equals the predetermined incremental amount of color registration misalignment, the color registration misalignment correction system is diagnosed as normal, if not substantially equal, the color registration misalignment correction is diagnosed as abnormal.

22. A method of correcting a color registration error comprising the steps of:

forming a plurality of registration error detecting patterns parallel to a fast scanning direction, said patterns comprising a plurality of sets each of which patterns having different predetermined colors and being disposed to each other in sequence, in which the number of said patterns of a particular color of said predetermined color is at least n+1, where n is a predetermined positive integer, and the number of said patterns of any other color is at last n;

transferring said patterns on a pattern transfer member;

moving said pattern transfer member by a predetermined distance;

detecting positions of said patterns on said pattern transfer member, while said member moves by the predetermined distance;

determining reference values $R_j$ for each color by an equation of:

$$R_j = \{\Sigma(T_{1,j+1}-T_{1,j})/n\}/\{\Sigma(T_{ij}-T_{1j})/n\} = (T_{1,n+1}-T_{1,1})/\{\Sigma(T_{ij}-T_{1j})\}$$

where $\Sigma$ occurs for the range of j= 1 to j=n; $T_{1j}$ is the time at which a jth line portion of the particular color arrives at said pattern detecting means; and $T_{ij}$ is the time at which a jth line portion of any other color arrives at said pattern detecting means (i is the number of colors and an integer of 2 or more); and correcting the color registration error so that the detected values $R_j$ for each color value becomes said reference values $R_j$.

23. A method of correcting a color registration error according to claim 22, wherein the distances among color patterns are different from each other, and said reference values $R_j$ are determined by the positions of said color patterns.

24. A method of correcting a color registration error according to claim 22, wherein the distances among color patterns are even from each other, and said reference value $R_j$ are determined by the positions of said color patterns.

* * * * *

UNITED STATES PATENT AND TRADEMARK OFFICE
CERTIFICATE OF CORRECTION

PATENT NO. : 5,523,823
DATED : June 04, 1996
INVENTOR(S) : Hideaki ASHIKAGA

It is certified that error appears in the above-indentified patent and that said Letters Patent is hereby corrected as shown below:

Claim 1, column 15, line 65, "$\Sigma$occurs" should read --$\Sigma$ occurs--.

Claim 21, column 18, line 20, "predetermine colors" should read --predetermined colors different from--.

\* Claim 21 column 18, line 26, "comprises" should read --comprise--.

Signed and Sealed this

Third Day of December, 1996

*Attest:*

BRUCE LEHMAN

*Attesting Officer*      *Commissioner of Patents and Trademarks*